(12) United States Patent
Ovsjanikovs et al.

(10) Patent No.: US 9,372,871 B2
(45) Date of Patent: Jun. 21, 2016

(54) COMBINING UNSTRUCTURED IMAGE AND 3D SEARCH RESULTS FOR INTERACTIVE SEARCH AND EXPLORATION

(71) Applicant: Google Inc., Mountain View, CA (US)

(72) Inventors: Maks Ovsjanikovs, Menlo Park, CA (US); Ehud Rivlin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 629 days.

(21) Appl. No.: 13/647,961

(22) Filed: Oct. 9, 2012

(65) Prior Publication Data

US 2015/0169636 A1 Jun. 18, 2015

Related U.S. Application Data

(60) Provisional application No. 61/693,003, filed on Aug. 24, 2012.

(51) Int. Cl.
*G06F 17/30* (2006.01)
(52) U.S. Cl.
CPC .... *G06F 17/30256* (2013.01); *G06F 17/30247* (2013.01); *G06F 17/30864* (2013.01); *G06F 17/30994* (2013.01)
(58) Field of Classification Search
CPC .................................................. G06F 17/30247
USPC ......................................................... 707/737
See application file for complete search history.

(56) References Cited

U.S. PATENT DOCUMENTS

| 6,628,824 | B1 * | 9/2003 | Belanger ....................... 382/165 |
| 8,169,433 | B2 * | 5/2012 | Wang et al. ................... 345/419 |
| 2004/0103093 | A1 * | 5/2004 | Furuhashi et al. ................. 707/3 |
| 2004/0249809 | A1 * | 12/2004 | Ramani et al. ..................... 707/4 |
| 2006/0036577 | A1 * | 2/2006 | Knighton et al. .................. 707/3 |
| 2009/0096790 | A1 * | 4/2009 | Wiedemann et al. ......... 345/427 |
| 2010/0049629 | A1 * | 2/2010 | Rathod et al. .................... 705/27 |
| 2010/0153449 | A1 * | 6/2010 | Baba et al. ..................... 707/780 |
| 2010/0223299 | A1 * | 9/2010 | Yun .............................. 707/803 |

OTHER PUBLICATIONS

Melanie Tory, "Combining 2D and 3D Views for Visualization of Spatial Data", Thesis, Simon Fraser University, Jul. 2004, 218 pages.

* cited by examiner

*Primary Examiner* — Kris Mackes
(74) *Attorney, Agent, or Firm* — Fish & Richardson P.C.

(57) ABSTRACT

Implementations relate to presenting search results to a user. In particular, disclosed techniques include presenting both image search results and 3D model search results to a user. The user can manipulate the 3D model depicted in the 3D model search results by rotating, translating or zooming. Implementations thus provide a rich synergistic exploration experience to the user.

18 Claims, 5 Drawing Sheets

COMBINING UNSTRUCTURED IMAGE AND 3D SEARCH RESULTS FOR INTERACTIVE SEARCH AND EXPLORATION

RELATED APPLICATIONS

This application claims priority to U.S. Provisional Patent Application No. 61/693,003, filed Aug. 24, 2012, to Rivlin and Ovsjanikovs, the contents of which are hereby incorporated by reference in its entirety.

BACKGROUND

Disclosed techniques relate to systems for, and methods of, presenting image and three-dimensional model search results.

Users can obtain image search results from search engines. Further, users can obtain 3D models of, e.g., real-world objects. A user can obtain a 3D model independently from the user's image search.

SUMMARY

According to some implementations, a method is presented. The method includes obtaining a search query, obtaining a plurality of image search results responsive to the search query, and obtaining 3D model search results including a 3D model responsive to the search query. The method also includes providing, in response to the search query, the 3D model search results and at least one of the image search results. The method further includes obtaining view selection data, obtaining a view of the 3D model responsive to the view selection data, and providing, in response to the view selection data, the view of the 3D model.

The above implementations can optionally include one or more of the following. The methods can include selecting a view of the 3D model that matches the at least one of the image search results, where the providing a 3D model search results includes providing the 3D model with the view that matches the at least one of the image search results. The selecting a view can include sampling a plurality of views of the 3D model, and matching at least one of the plurality of views to the at least one of the image search results. The methods can include dynamically providing a user selected view of the 3D model. The methods can include matching the user selected view of the 3D model to a matched one of the image search results, and providing the matched one of the image search results. The view selection data can include an input indicating a rotation, where the obtaining a view of the 3D model responsive to the view selection data can include rotating the 3D model. The view selection data can include an input indicating a translation, where the obtaining a view of the 3D model responsive to the view selection data can include translating the 3D model. The view selection data can include an input indicating a zoom, and the obtaining a view of the 3D model responsive to the view selection data can include zooming the 3D model.

According to some implementations, a system is presented. The system includes an interface configured to obtain a search query, an interface configured to obtain a plurality of image search results responsive to the search query, an interface configured to obtain at least one 3D model search result including a 3D model responsive to the search query, and an interface configured to provide, in response to the search query, the 3D model search results and at least one of the image search results. The system further includes an interface configured to obtain view selection data, a processor configured to select a view of the 3D model responsive to the view selection data, and an interface configured to provide, in response to the view selection data, the view of the 3D model.

The above implementations can optionally include one or more of the following. The systems can include a processor configured to select a view of the 3D model that matches the at least one of the image search results, where the processor configured to provide a 3D model can be further configured to provide the 3D model with the view that matches the at least one of the image search results. The processor configured to select a view can be further configured to sample a plurality of views of the 3D model, and match at least one of the plurality of views to the at least one of the plurality of image search results. The systems can further include a processor configured to dynamically provide a user selected view of the 3D model. The systems can further include a processor configured to match the user selected view of the 3D model to a matched one of the image search results, and a processor configured to provide the matched one of the image search results. The view selection data can include an input indicating a rotation, and the processor configured to obtain a view of the 3D model responsive to the view selection data can be further configured to rotate the 3D model. The view selection data can include an input indicating a translation, and the processor configured to obtain a view of the 3D model responsive to the view selection data can be further configured to translate the 3D model. The view selection data can include an input indicating a zoom, and the processor configured to obtain a view of the 3D model responsive to the view selection data can be further configured to zoom the 3D model.

According to some implementations, a method is presented. The method includes providing a search query, obtaining, in response to the search query, at least one 3D model search result including a 3D model and at least one image search result, providing view selection data, and obtaining a view of the 3D model responsive to the view selection data.

The above implementations can optionally include one or more of the following. The providing view selection data can include providing using at least one of: rotation controls, translation controls, and zoom controls. The view selection data can include an input indicating a rotation, and the obtaining a view of the 3D model responsive to the view selection data can include obtaining a rotated 3D model. The view selection data can include an input indicating a translation, and the obtaining a view of the 3D model responsive to the view selection data can include obtaining a translated 3D model. The view selection data can include an input indicating a zoom, and the obtaining a view of the 3D model responsive to the view selection data can include obtaining a zoomed 3D model.

Presented techniques include certain technical advantages, such as increased efficiency. For example, a user need only enter a single search query and obtain in response both image and 3D model search results. Further, the user can interact with the 3D model and obtain corresponding images automatically, without having to provide an additional search query.

DESCRIPTION OF DRAWINGS

The accompanying drawings, which are incorporated in and constitute a part of this specification, illustrate implementations of the disclosed techniques and together with the description, serve to explain the principles of the disclosed techniques. In the figures.

DETAILED DESCRIPTION

As used herein, the term "image" refers to a computer-implementable two-dimensional likeness. In general, an image can be represented in a computer using a variety of file types, such as by way of non-limiting example: JPEG, GIF, BMP, etc.

As used herein, the term "3D model" refers to a computer-implementable representation of at least the surface of a three-dimensional ("3D") object. 3D models can be displayed in two dimensions, e.g., on a computer screen or printed on paper. A user interface can allow a user to rotate, translate or zoom in on a 3D model displayed on a computer screen. 3D models can also be rendered in three dimensions, e.g., using a 3D printer. In general, 3D models can be represented in a computer using a variety of file types, such as by way of non-limiting example: 3DS, 3D DWG, 3D DXF, KMZ, FBS, OBJ, XSI, etc.

In general, implementations provide a user's device, in response to a search query, with both 3D model search results that includes at least 3D model together with at least one image search result. The 3D model search result and image search result(s) can be displayed to the user in a web browser, for example. This is particularly useful for, but not limited to, viewing architectural landmarks. In some implementations, the user can dynamically manipulate the 3D model so as to view the searched-for object from various orientations. In some implementations, the image search results are dynamically updated to match the particular view of the 3D model being displayed.

Reference will now be made in detail to example implementations of the disclosed techniques, which are illustrated in the accompanying drawings. Where possible the same reference numbers will be used throughout the drawings to refer to the same or like parts.

Figure 1:
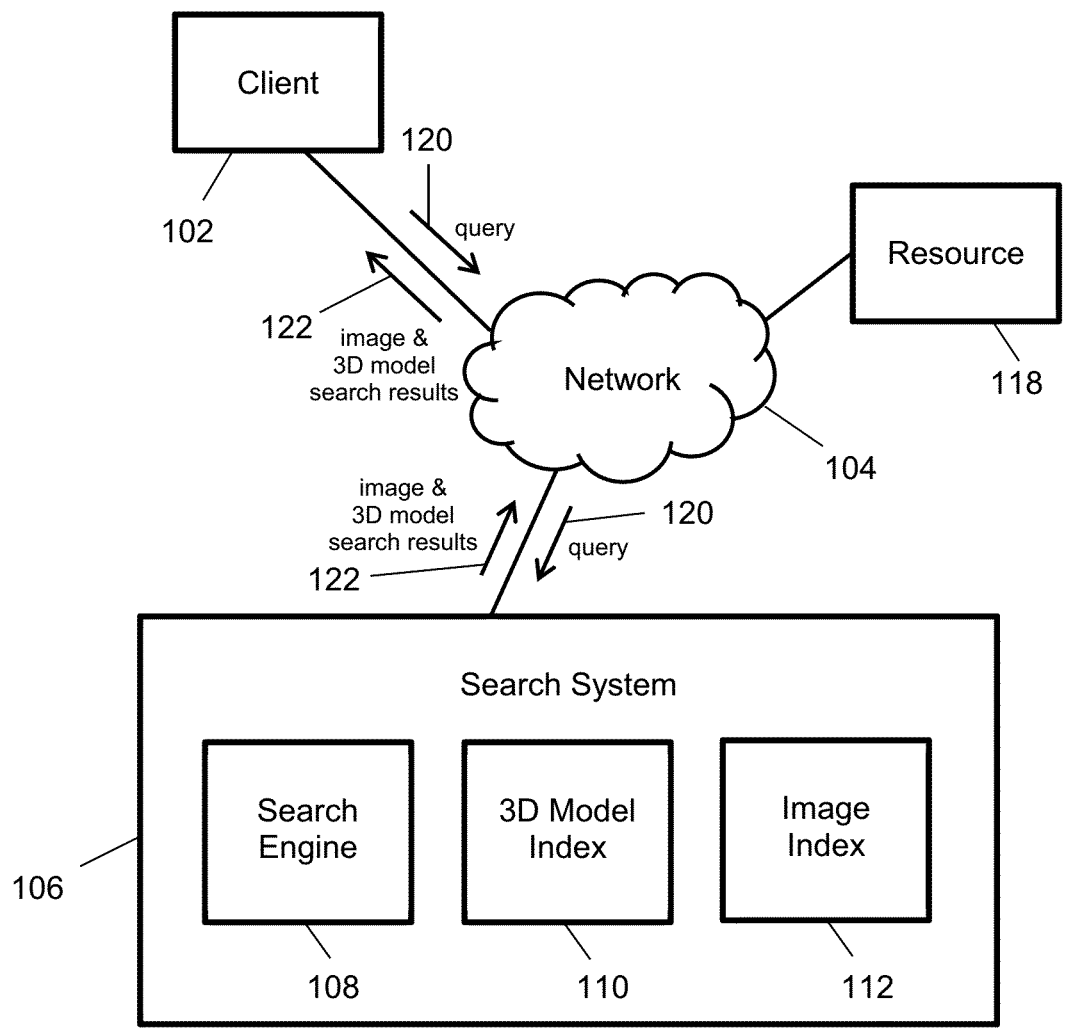
FIG. 1 is a schematic diagram of a system according to some implementations.

FIG. 1 is a schematic diagram of a system according to various implementations. Thus, FIG. 1 illustrates various hardware, software, and other resources that can be used in implementations of search system 106 according to presented techniques. Search system 106 is coupled to network 104, for example, the internet. Client 102 is also coupled to network 104 such that search system 106 and client 102 are communicatively coupled. Client 102 can be a personal computer, tablet computer, desktop computer, or any other computing device.

Using a web browser, for example, a user of client 102 sends a query 120 to search system 106 through network 104. The query can be textual terms and/or an image. Search system 106 receives query 120 and processes it using search engine 108. If the query is an image, search engine 108 obtains corresponding textual terms using known techniques. Search engine 108 uses the textual terms to obtain image and 3D model search results. For image search results, search engine 108 utilizes image index 112 to match the textual terms. For 3D model search results, search engine 108 utilizes 3D model index 110 to match the textual terms. Image index 112 includes thumbnail images in association with keywords; 3D model index includes 3D models in association with keywords. Search system 106 can retrieve original copies of images and 3D models beforehand from, for example, resource 118, which can be, for example, a web page or a document. Search system 106 can store corresponding thumbnail images in image index 112, and store 3D models in 3D model index 110. Using conventional techniques, search engine 108 identifies images in image index 112 and 3D models in 3D model index 110 that are responsive to query 120 based on matching keywords in image index 112 and 3D model index 110, respectively, to the textual terms of, or corresponding to, query 120. (Although keyword matching is described here as an example, implementations can use other techniques for identifying images and 3D models responsive to the user's query instead of, or in the alternative.) Search engine 108 can provide rankings of the search results based upon, for example, an accuracy of matching between, on the one hand, the search query textual terms and, on the other hand, the keywords present in the indexes. The ranking can alternately, or additionally, be based on a search results quality score that accounts for, e.g., a number of incoming links to the resources corresponding to the search results.

Search system 106 conveys the responsive image and 3D model search results 122 back to client 102 through network 104. Client 102 displays such search results, for example, in a web browser. Each image search result includes a uniform resource locator (URL) for the resource from which it was retrieved to obtain the corresponding thumbnail image. Each 3D model search result includes a URL for the resource from which it was retrieved to obtain the 3D model. Thus, clicking on an image or 3D model search result can activate the associated URL that directs the user's browser to resource 218 in which the image or 3D model, respectively, appeared.

The user can manipulate the 3D model by, for example, zooming, rotating, and translating. Zooming means, for example, making the user's view of the 3D model larger or smaller. That is, zooming embraces both enlarging and diminishing. Rotating here means, for example, rotating the 3D model about any of the x-axis, y-axis or z-axis in a normally situated Cartesian coordinate system. The user's view accordingly changes with rotating such that additional portions of the 3D model become visible. Translating here means, for example, moving the user's perspective of the 3D model up, down, left or right in a plane perpendicular to a ray projecting from the user's virtual location to the surface of the model. Thus, a user can translate the 3D model such that the view slides from side-to-side or up-and-down.

The user can accomplish these manipulations using, for example, a set of graphical user interface controls. An example set of controls is depicted and described below in reference to FIG. 5.

Figure 2:
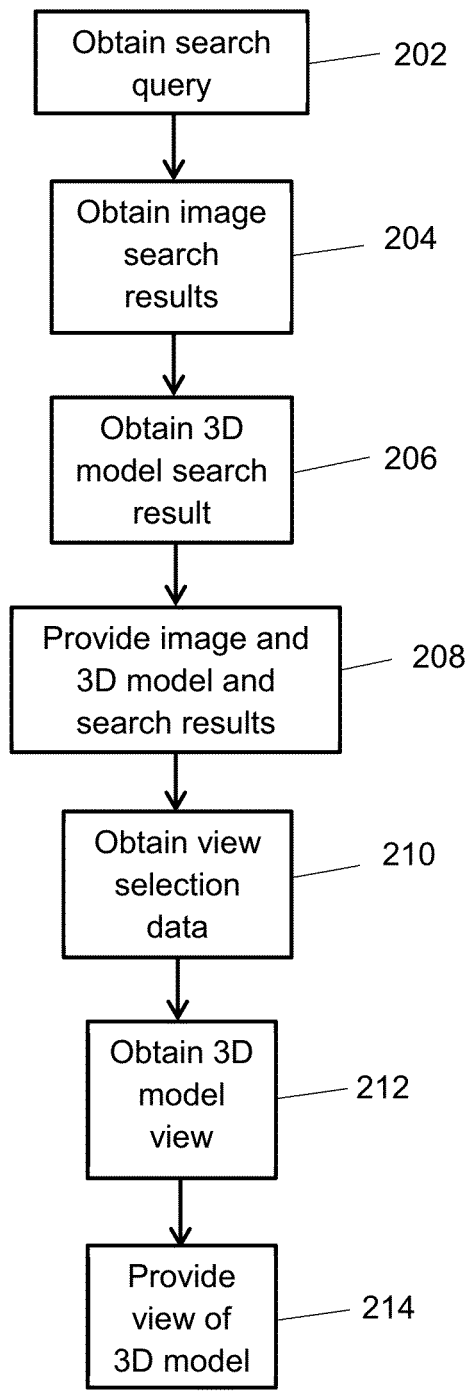
FIG. 2 is a flowchart of a method according to some implementations.

FIG. 2 is a flowchart of a method according to some implementations. The method of FIG. 2 can be implemented using, by way of non-limiting example, computer search system 106 of FIG. 1. At block 202, search system 106 of FIG. 1 obtains a search query. The search query can be sent over a network, e.g., network 104 of FIG. 1, from a personal computer, e.g., client 102 of FIG. 1, operated by a user. The user can enter the search query into a query field of a search web page, which can be opened in a web browser executing on the user's personal computer or other computing device. The user's computing device can automatically format the search query in any of several computer interpretable languages, by way of non-limiting example, HTML or XML, and communicate the query to computer search system 106 of FIG. 1, using any of several protocols, again by way of non-limiting examples, TCP/IP or HTTP. The search query can be received at a server or bank of servers, by way of non-limiting example, network interface 108 of FIG. 1.

At block 204, the system obtains a set of image search results responsive to the search query using image index 112. At block 206, the system obtains a 3D model search result, including a 3D model and responsive to the search query, using 3D model index 110. At block 208, the system provides the image search results and 3D model search result to client 102.

In some implementations, the system can provide a view of the 3D model that matches at least one of the images. In some implementations, the system selects the image having the highest, or near highest, relevance to the search query to match with a view of the 3D model.

Implementations can perform the matching as follows. First, the system can select an image to match with a view of the 3D model, e.g., the most relevant image. Second, the system can sample a number, e.g., 10, 100, 1000, 5000, of views of the 3D model. Each sample produces an image corresponding to the 3D model as seen from a different view. (Throughout, a view of a 3D model means, for example, a portion of the model that a user would be able to see. Thus, a view of a model can include, for example, a depiction of the model presented to the user on a computer monitor. However, views of a 3D model can exist independent of whether they are actually presented visually to a user.) The views themselves can be selected by uniformly parsing a virtual sphere about the object. Each view gives rise to a different image, e.g., a different perspective view of the object.

Third, the system attempts to match each view of the 3D model with the selected image. This matching can select the view that matches the largest subset of the selected image. By matching subsets, the issue of background imagery is obviated. To select the view of the 3D model that best matches the selected image, the system can proceed as follows. Using known techniques, the system can identify local descriptors with high interest levels in the selected image and each view. The system can normalize the selected image and each view to account for geometric transformations. The system can generate offset spaces for each view relative to the selected image. From each offset space, the system can the identify corresponding visual phrases. The system can select the view associated with the largest visual phrase, e.g., the visual phrase with the most local descriptors. Once determined, the view is then provided to client 102.

At block 210, the system obtains view selection data. The 3D model search result itself can include view selection controls that the user can activate to select a view of the 3D model presented in the 3D model search results. For example, the user can manipulate the 3D model by rotating, translating or zooming. The user can effectuate such manipulations by providing view selection data using the following view selection controls: rotation controls, translation controls, and zoom controls. A further discussion of view selection controls appears below in reference to FIG. 5.

At block 212, the system obtains a 3D model view responsive to the view selection data. In particular, the system operates on the 3D model using the obtained view selection data to obtain a corresponding manipulated view of the 3D model using known techniques. At block 214, the system provides the view of the 3D model to the client.

Figure 3:
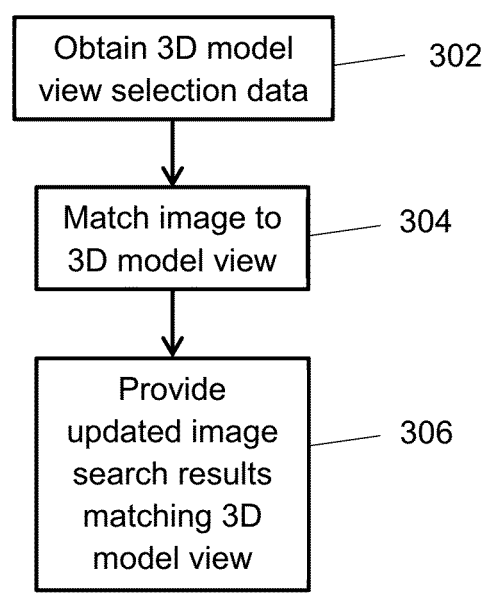
FIG. 3 is a flowchart of a method according to some implementations.

FIG. 3 is a flow chart of a method according to some implementations. The method of FIG. 3 can be implemented using, e.g., the system described above in reference to FIG. 1.

The method of FIG. 3 can be implemented after the method of FIG. 2. More particularly, once the user receives the image and 3D model search results, the method of FIG. 3 can be performed to provide updated image search results to the user depending on the user's manipulations of the 3D model. Thus, the method of FIG. 3 can be implemented subsequent to, for example, the user's computing device displaying the image and 3D model search results.

At block 302, the system, e.g., search system 106 of FIG. 1, receives 3D model view selection data. The view selection data indicates the particular view of the 3D model that is visible to the user. Such data can be represented in, e.g., Cartesian, cylindrical or spherical coordinates. The system can receive the view selection data whenever the user changes the view of the 3D model. For example, if the user rotates the 3D model 90°, the model displayed by the user's computing machine can pass through a number of different, discrete, views before completing the rotation. These discrete views can appear as a fluid motion to the user. For each discrete view, the user's computing machine can report data indicating the view to the system, e.g., processors 110 of FIG. 1. The user's computing machine can, e.g., utilize a script to capture and provide the view selection data.

At block 304, the system matches an image search result to the particular indicated view. That is, each time the system receives new view selection data, it can match the particular indicated view with an image responsive to the original search query, e.g., an image received at block 206 of FIG. 2. The system can cache such images, e.g., in persistent memory 112 of FIG. 1. Note that some implementations can perform the matching of block 304 on the user's computing device, thus obviating the client-server interactions of blocks 302 and 306.

At block 306, the system sends the matching image to the user's computing device. That is, for each view and matching image, the system can convey supplemental instructions and images to the user's computing device to display the matching image.

In this manner, the images displayed to the user dynamically adjust, as the user dynamically changes the view of the 3D model. In particular, the displayed images adjust to match the displayed view of the 3D model. The user's viewing experience is thus richly supplemented with both geometric information from the 3D model and textures and other details from the matching images. The simultaneous display thus provides a synergistic exploration experience to the user.

Figure 4:
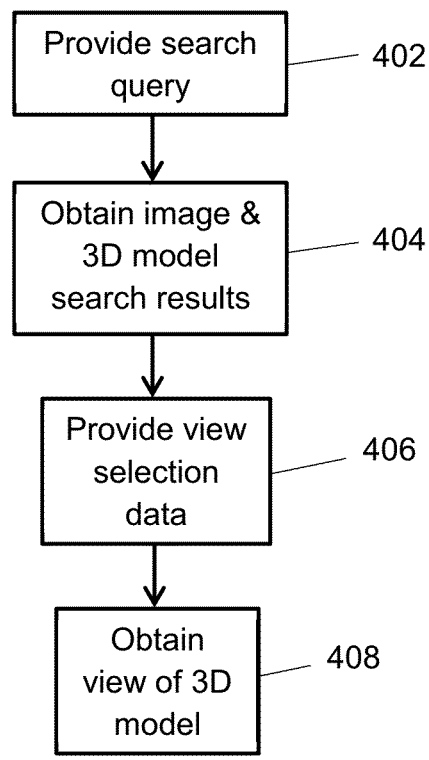
FIG. 4 is a flowchart of a method according to some implementations.

FIG. 4 is a flow chart of a method according to some implementations. The method of FIG. 4 can be a client-side technique corresponding to the server-side technique, for example, described above in reference to FIG. 2. Thus, the method of FIG. 4 can be implemented using, e.g., client 102 of FIG. 1.

At block 402, the client provides a search query. The search query can be entered using a web browser at client 102, for example. The search query can be as described above in reference to FIG. 2; e.g., the search query can include one or both of a set of textual terms and an image. The textual terms of the search query can be provided to a search system, e.g., search system 106 as described above in reference to FIG. 1. The textual terms can be processed according to, e.g., blocks 202-206 of FIG. 2.

At block 404, the client obtains 3D model and image search results. The 3D model and image search results can be obtained from, e.g., search system 106 of FIG. 1. Search system 106 can provide the 3D model and image search results, e.g., as described above in reference to block 208 of FIG. 2.

At block 406, the client provides view selection data. The client can provide such view selection data using view selection controls as described above in reference to block 210 of FIG. 2 and as described below in reference to features 512-516 of FIG. 5.

At block 408, the client obtains a view of the 3D model. The view of the 3D model is responsive to the view selection data provided at block 408. The view of the 3D model is obtained from, for example, search system 106 of FIG. 1 using known techniques for manipulating 3D models in response to user-provided manipulation inputs.

Figure 5:
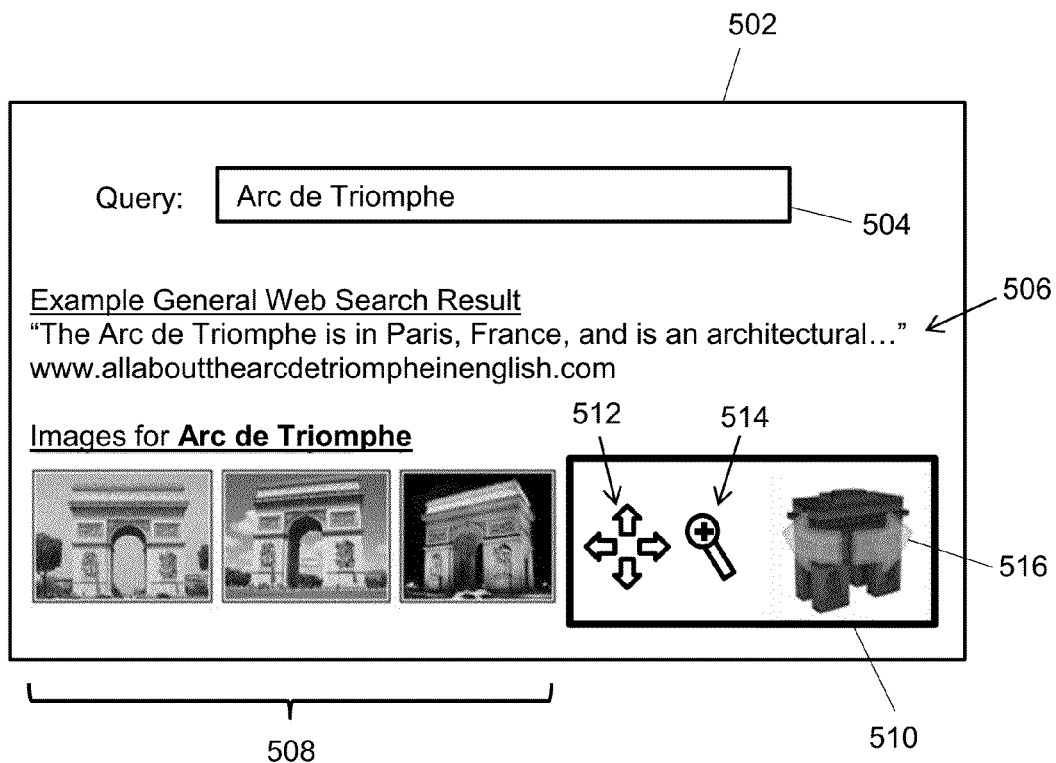
FIG. 5 is an example schematic diagram of a formatted display of image and a 3D model search results according to some implementations.

FIG. 5 is an example schematic diagram of a display of image and 3D model search results according to some implementations. Display 502 can be all or a portion of a web page, e.g., a search web page. Display 502 can be, by way of non-limiting example, formatted to display the image and 3D model search results provided at block 208 of FIG. 2. Display 502 can include field 504, into which a user can enter a search query. Field 504 can be populated with a query whose associated results are presented in display 502.

Display 502 includes image search results 508 and 3D model search results 510. Image search results 508 can appear in order of relevance, e.g., with the most relevant appearing at the right hand side. The relevance can correspond to the rankings obtained from search system 106, for example. 3D model search results can appear to the right or left of image search results 508, or elsewhere on the formatted display.

3D model search results 510 can be presented along with view selection controls that allow a user to provide view selection data. The user can provide such view selection data using one or more of the following view selection controls: rotation controls, translation controls, and zoom controls.

For example, 3D model search results 510 can include depictions of arched arrows 516 that serve as rotation controls. A user clicking on one of arched arrows 516 causes the view of the 3D model visible in 3D model search results 510 to rotate in the direction indicated by the arrow. Alternately, in some implementations, the user can use a mouse pointer as a rotation control by grabbing a portion of the 3D model and dragging it in the direction of the desired rotation.

As another example, 3D model search results 510 can include depictions of four-way arrows 512 that serve as translation controls. A user clicking on one of the four-way arrows causes the view of the 3D model visible in the 3D model search results 510 to shift in the direction indicated by the arrow. Alternately, in some implementations, the user can use a mouse pointer as a translation control by grabbing a portion of the 3D model and dragging it in the direction of the desired translation.

In implementations that include a mouse pointer that functions as both a rotation control and a translation control, the user can select which type of action is to occur by, for example, holding down a key during the grabbing and dragging operations to differentiate rotation from translation. For example, in such implementations, if a user grabs and drags while holding down a CONTROL key, the mouse pointer can serve as a rotation control; if the user grabs and drags without holding down a CONTROL key, the mouse pointer can serve as a translation control. Any of a variety of keys, not limited to a CONTROL key, can serve to differentiate the mouse pointer as being either of a translation control or a rotation control.

3D model search results can further include zooming controls. A depiction of magnifying glass 514 can server as such zooming controls. A user can click on magnifying glass 514 to enlarge the view of the 3D model visible in 3D model search results 510. In some implementations, clicking on magnifying glass 514 causes a pop-up control that allows a user to determine a magnification, or diminishment, of the view. Such a pop-up control can include a slider display that the user can manipulate to magnify or diminish the view. In some implementations, clicking on magnifying glass 514 while holding down a key, e.g., a CONTROL key, causes a diminishment of the view.

Display 502 can further include a presentation of one or more general search results 506. Such general search results 506 can include a title, an excerpt, and a hyperlink to the original source. General search results 506 can appear before or after image search results 508 and 3D model search results 510. In some implementations, general search results 506 can appear both before and after image search results 508 and 3D model search results 510.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. The system can include network interfaces to connect with clients through a network. Such interfaces can include one or more servers. Appropriate networks include the internet, as well as smaller networks such as wide area networks (WAN) and local area networks (LAN). Networks internal to businesses or enterprises are also contemplated. Communications can be formatted according to, e.g., HTML or XML, and can be communicated using, e.g., TCP/IP or HTTP. Further, each hardware component can include persistent storage, such as a hard drive or drive array, which can store program instructions to perform the techniques presented herein. Other configurations of search system 106, associated network connections, and other hardware, software, and service resources are possible. Similarly, the techniques presented in reference to FIGS. 2, 3 and 4 may be modified by, for example, removing or changing blocks.

The foregoing description is illustrative, and variations in configuration and implementation can occur. Other resources described as singular or integrated can in implementations be plural or distributed, and resources described as multiple or distributed can in implementations be combined. The scope of the disclosure is accordingly intended to be limited only by the following claims.

What is claimed is:

1. A computer-implemented method comprising:
receiving a search query;
obtaining (i) one or more image search results that are identified as responsive to the search query, and (ii) one or more three-dimensional models that are identified as responsive to the search query;
for each of the one or more three-dimensional models that are identified as responsive to the search query:
obtaining a candidate representative image that is associated with the three-dimensional model;
determining that the candidate representative image that is associated with the three-dimensional model matches a particular image search result of the one or more image search results that are identified as responsive to the search query; and
selecting the candidate representative image as a representative image for the three-dimensional model based at least on determining that the candidate representative image that is associated with the three-dimensional model matches the particular image search result of the one or more image search results that are identified as responsive to the search query; and in response to the search query, providing a search results page that identifies (i) one or more of the image search results, and (ii) the respective representative image that is associated with the each of the one or more three-dimensional models.

2. The method of claim 1, comprising:
generating the representative image from the three-dimensional model.

3. The method of claim 1, wherein determining that the candidate representative image of the three-dimensional model matches a particular image search result of the one or more image search results that are identified as responsive to the search query, comprises:
determining that visual features of an object in the candidate representative image are indicated as similar to visual features of the object in the particular image search result.

4. The method of claim 1, wherein determining that the candidate representative image of the three-dimensional model matches a particular image search result of the one or more image search results that are identified as responsive to the search query, comprises:
determining that visual features of an object in the candidate representative image are more similar to visual features of the object in the particular image search result than visual features of the object in other representative images representing different views of the object and generated from the three-dimensional model.

5. The method of claim 1, wherein determining that the candidate representative image of the three-dimensional model matches a particular image search result of the one or more image search results that are identified as responsive to the search query, comprises:
determining that the particular image search result is indicated as a most relevant search result associated with the search query.

6. The method of claim 1, wherein in response to the search query, providing a search results page that identifies (i) one or more of the image search results, and (ii) the representative image associated with the each of the one or more of the three-dimensional models, comprises:
providing each of the one or more of the three-dimensional models with an initial viewing angle that initially renders the representative image associated with the three-dimensional model.

7. A system comprising:
one or more computers and one or more storage devices storing instructions that are operable, when executed by the one or more computers, to cause the one or more computers to perform operations comprising:
receiving a search query;
obtaining (i) one or more image search results that are identified as responsive to the search query, and (ii) one or more three-dimensional models that are identified as responsive to the search query;
for each of the one or more three-dimensional models that are identified as responsive to the search query:
obtaining a candidate representative image that is associated with the three-dimensional model;
determining that the candidate representative image that is associated with the three-dimensional model matches a particular image search result of the one or more image search results that are identified as responsive to the search query; and selecting the candidate representative image as a representative image for the three-dimensional model based at least on determining that the candidate representative image that is associated with the three-dimensional model matches the particular image search result of the one or more image search results that are identified as responsive to the search query; and in response to the search query, providing a search results page that identifies (i) one or more of the image search results, and (ii) the respective representative image that is associated with the each of the one or more three-dimensional models.

8. The system of claim 7, wherein the operations further comprise:
generating the representative image from the three-dimensional model.

9. The system of claim 7, wherein determining that the candidate representative image of the three-dimensional model matches a particular image search result of the one or more image search results that are identified as responsive to the search query, comprises:
determining that visual features of an object in the candidate representative image are indicated as similar to visual features of the object in the particular image search result.

10. The system of claim 7, wherein determining that the candidate representative image of the three-dimensional model matches a particular image search result of the one or more image search results that are identified as responsive to the search query, comprises:
determining that visual features of an object in the candidate representative image are more similar to visual features of the object in the particular image search result than visual features of the object in other representative images representing different views of the object and generated from the three-dimensional model.

11. The system of claim 7, wherein determining that the candidate representative image of the three-dimensional model matches a particular image search result of the one or more image search results that are identified as responsive to the search query, comprises:
determining that the particular image search result is indicated as a most relevant search result associated with the search query.

12. The system of claim 7, wherein in response to the search query, providing a search results page that identifies (i) one or more of the image search results, and (ii) the representative image associated with the each of the one or more of the three-dimensional models, comprises:
providing each of the one or more of the three-dimensional models with an initial viewing angle that initially renders the representative image associated with the three-dimensional model.

13. A non-transitory computer-readable medium storing software comprising instructions executable by one or more computers which, upon such execution, cause the one or more computers to perform operations comprising:
receiving a search query;
obtaining (i) one or more image search results that are identified as responsive to the search query, and (ii) one or more three-dimensional models that are identified as responsive to the search query;
for each of the one or more three-dimensional models that are identified as responsive to the search query:
obtaining a candidate representative image that is associated with the three-dimensional model;

determining that the candidate representative image that is associated with the three-dimensional model matches a particular image search result of the one or more image search results that are identified as responsive to the search query; and selecting the candidate representative image as a representative image for the three-dimensional model based at least on determining that the candidate representative image that is associated with the three-dimensional model matches the particular image search result of the one or more image search results that are identified as responsive to the search query; and in response to the search query, providing a search results page that identifies (i) one or more of the image search results, and (ii) the respective representative image that is associated with the each of the one or more three-dimensional models.

14. The medium of claim 13, wherein the operations further comprise:

generating the representative image from the three-dimensional model.

15. The medium of claim 13, wherein determining that the candidate representative image of the three-dimensional model matches a particular image search result of the one or more image search results that are identified as responsive to the search query, comprises:

determining that visual features of an object in the candidate representative image are more similar to visual features of the object in the particular image search result than visual features of the object in other representative images representing different views of the object and generated from the three-dimensional model.

16. The medium of claim 13, wherein determining that the candidate representative image of the three-dimensional model matches a particular image search result of the one or more image search results that are identified as responsive to the search query, comprises:

determining that the particular image search result is indicated as a most relevant search result associated with the search query.

17. The medium of claim 13, wherein determining that the candidate representative image of the three-dimensional model matches a particular image search result of the one or more image search results that are identified as responsive to the search query, comprises:

determining that visual features of an object in the candidate representative image are indicated as similar to visual features of the object in the particular image search result.

18. The medium of claim 13, wherein in response to the search query, providing a search results page that identifies (i) one or more of the image search results, and (ii) the representative image associated with the each of the one or more of the three-dimensional models, comprises:

providing each of the one or more of the three-dimensional models with an initial viewing angle that initially renders the representative image associated with the three-dimensional model.

* * * * *